March 10, 1925.

H. FENDERL

LUMINOUS SIGN, SIGHT, OR THE LIKE

Filed July 17, 1919

1,529,643

Inventor
H. Fenderl,
By H. R. Kerslake
Attorney

Patented Mar. 10, 1925.

1,529,643

UNITED STATES PATENT OFFICE.

HEKTOR FENDERL, OF ROME, ITALY.

LUMINOUS SIGN, SIGHT, OR THE LIKE.

Application filed July 17, 1919. Serial No. 311,629.

(GRANTED UNDER THE PROVISIONS OF THE ACT OF MARCH 3, 1921, 41 STAT. L., 1313.)

*To all whom it may concern:*

Be it known that I, HEKTOR FENDERL, a subject of the King of Italy, residing at 14 Via Sardegna, Rome, in the Kingdom of Italy, have invented certain new and useful Improvements in or Relating to Luminous Signs, Sights, or the like, for which I have filed application in Austria, August 27, 1915, #71,684, Italy, March 12, 1919; Germany, September 29, 1915, of which the following is a specification.

In order to make visual signs readable even in the dark, they have hitherto sometimes been coated with self-luminous substances, such for instance as metallic sulphides made active by means of radium, or the position thereof have been indicated approximately by means of mark provided with such substances, but always in such a way that the sight signs of the marks themselves are luminous and the rays of light from the self-luminous substances meet the eye directly.

In the case of such known arrangements the disadvantages arise that the eye is dazzled by the radiations of the luminous material meeting it directly, the field of vision, filled with the phosphorescent clouds, aureoles and scintillations that arise, accordingly does not seem clear in parts, and the visual sign itself is either not perceived at all or else is only perceived indistinctly and inexactly. These serious disadvantages are prejudicial to the very object in view as the eye is disturbed in its observation, the field of vision is made indistinct and obscure and the outlines of the sight or visual sign become uncertain, whereby, particularly in the case of sighting and measuring apparatus, in which clearness, exactitude and prompt reception of the aiming and reading off apparatus are conditions of their existence, the applicability of such devices is either excluded or at least becomes misleading. In the case of thin sight signs, as for example in the case of the cross wires of telescopes or in the case of micrometer scales, the coating with self-luminous substances is moreover from the nature of the case difficult to carry out, on account of the minute dimensions and of the exactitude required, whereby the scope for the employment of self-luminous substances is materially restricted.

The present invention eliminates these foregoing stated disadvantages by not arranging the self-luminous substances on the sight or visual signs, or marks themselves and moreover by arranging matters in such a way that the rays of light therefrom do not meet the eye directly, but are laterally displaced round the visual sign and masked from the eye by means of screens, whereby the rays of light from the self-luminous substances do not meet the eye directly but strike the visual signs and make these visible to the eye by reflection. The disadvantages previously complained of, no longer arise in the case of this arrangement, but the eye carries on its work unhampered by secondary phenomena, the field of vision appears clear and the visual signs are clearly and accurately perceived. By this means visual signs of even the smallest imaginable dimension can be made accurately perceptible in the dark, whereby a considerable widening of the scope of application thereof is produced. In particular cases the arrangements are advantageously hit upon of making the support of the visual sign out of transparent material, such as glass for example, forming the visual signs, thereon out of plane surfaces making an angle with those of the periphery of the support and arranging the self-luminous masses directly on these peripheral plane surfaces of the support but concealing them from the eye by means of screens. In the case of such an arrangement the rays of light from the self-luminous substances reach the surfaces of the visual sign through the transparent material of the support without having to pass through layers of air, and make them visible to the eye by reflection or else by refraction. In this case the field of vision remains absolutely dark and the visual signs appear standing out sharply therefrom. By means of such arrangements visual signs can be made perceptible in the dark, even when they are located in liquids. The arrangements according to the present invention enable the visual signs to be left unchanged and untouched and to be utilized, which in connection with the manufacture and accuracy of instruments of precision is of great value, and the circumstances that they can be lodged in a small space inside the frame of the support of the visual sign and in the interior of the instruments and apparatus, and that they remain unnoticed by daylight and do not in any respect hinder the handling and using of the instruments and apparatus provided therewith, exhibit still further characteristics and essential advantages of this invention.

The present invention is applicable in the case of sighting and measuring apparatus for telescopes and other optical and other land surveying or geodetic, aiming, measuring and experimental instruments, for artillery and small arms, as well as in all other cases in which visual signs have to be made perceptible in the dark.

Five examples of such applications are illustrated in the accompanying drawing.

In the drawings Figure 1 shows a front and a vertical sectional view of a telescope lens provided with my improvement.

Figure 1:
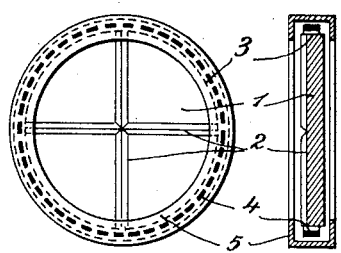

In the embodiment of the invention illustrated in Fig. 1 I have shown a telescope lens 1 having one of its faces provided with raised ridges 2 which are arranged at right angles to each other and intersect the axis of the lens. The periphery 3 of the lens is provided with a ring 4 of the self-luminous substance and a channel-shaped border ring 5 encloses said substance and conceals the same from the observer. With this construction the border frame will reflect the luminous substance or the rays from the luminous substance on to the markings 2 and this will enable the markings to be seen without permitting the glaring effect of the luminous substance.

Figure 2:
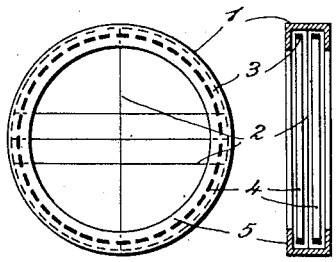
Fig. 2 shows a modification of a telescope lens arrangement.

In the form shown in Fig. 2 a series of crossed wires $2^a$ are arranged between lenses $4^a$ and luminous rings $3^a$ are arranged at the peripheries of said lenses and are concealed by a border ring $1^a$ having inwardly extending flanges $5^a$. The operation of this lens will be similar to that described in connection with Fig. 1.

Figure 3:
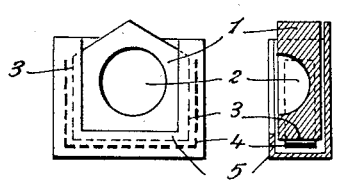
Fig. 3 shows a front and vertical sectional view of a front gun sight provided with my invention.

In Fig. 3 I have illustrated a front sight for fire arms in which the sight proper $1^b$ is formed of transparent material and is provided in its rear with a semi-spherical depression $2^b$. In this case the side and bottom edges $3^b$ of the sight proper is provided with a luminous strip $4^b$ enclosed by a casing $5^b$ which permits the rear portion of the sight proper to be seen. With this construction the inner surfaces of the sides and bottom of the casing will reflect the rays from the luminous substance through the transparent body $1^b$ and the surface of the depression $2^b$ will cause the rays to be concentrated at a point coincident with the axis of said depression.

Figure 4:
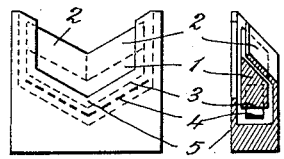
Fig. 4 shows a front and vertical sectional view of a gun rear sight provided with my improvements.

In the form shown in Fig. 4 a rear sight is disclosed in which $1^c$ designates the transparent portion of the sight which is provided with a notch $2^c$ having an inclined rear surface line 6. The transparent body has parallel side edges and angularly arranged bottom edges $3^c$, and a luminous strip 4 is arranged around the side and bottom edges of the transparent body. A casing $5^c$ partially encloses said transparent body and entirely encloses said luminous body, and as the rear portion of the casing is cut away it will permit observation of the transparent body.

Figure 5:
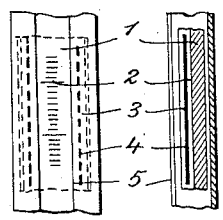
Fig. 5 shows a front and a vertical sectional view of a portion of a micrometer scale in accordance with the invention.

In the embodiment of the invention illustrated in Fig. 5 I have shown a micrometer scale $1^d$ provided with the usual marking $2^d$. The side edges $3^d$ of the scale are provided with luminous strips $4^d$ the rays of light from which are reflected on to the scale markings by means of the casing $5^d$ which conceals the luminous material.

Figure 6:
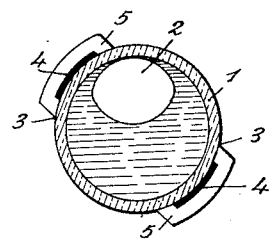
Fig. 6 shows a transverse sectional view of a liquid level provided with my improvements.

Fig. 6 illustrates the application of the invention to a liquid level in which $1^e$ is a section of a glass tube, $2^e$ the usual bubble, $3^e$ the peripheral surface of the tube, $4^e$ the luminous material arranged at diametrically opposite sides of the tube, and $5^e$ the casings which conceal the luminous substances and reflect the light from the same into the tube $1^e$.

Having now particularly described and ascertained the nature of my said invention, and in what manner the same is to be performed, I declare that what I claim is:—

1. The combination with an indicating device, of a luminous substance designed to illuminate said indicating device, and means for concealing said substance from the observer and for reflecting the rays from the luminous substance on to said indicating device.

2. A combination as defined in claim 1, in which the luminous substance is arranged at the edge of said indicating device.

3. A combination as defined in claim 1 in which the luminous substance is arranged at the edge of the indicating device, and the casing encloses said luminous substance and the edge of said indicating device.

4. The combination with an indicating device, of a luminous substance arranged adjacent the same for illuminating said device, and means for concealing said luminous substance from the vision of the observer.

5. A luminous sign comprising a transparent body, a relatively deep and narrow groove in a surface thereof defining a hairline and a radium-luminous substance to make said hair-line visible.

6. A body of glass, a relatively deep and narrow groove in a surface thereof defining a hair-line and a radium-luminous substance to make said hair-line visible.

7. A glass plate, having a relatively deep and narrow groove in a surface thereof defining a hair-line and a radium-luminous substance disposed along the edge of the said glass plate.

8. A glass disk, a relatively deep and narrow groove in a surface thereof and a radium luminous substance disposed along substantially the whole periphery thereof.

9. The combination with an optical instrument, of a transparent body, relatively deep and narrow grooves in a surface thereof defining hair-lines and a radium luminous substance to make said hair-lines visible.

10. The combination with an optical instrument, of a glass plate, a relatively deep and narrow groove in a surface thereof defining a line of reference and a radium-luminous substance to make said line visible.

11. The combination with an optical instrument, of a glass plate in an image plane thereof, a relatively deep and narrow groove in a surface thereof to define a hair-line and a radium-luminous substance to make said hair-line visible.

12. The combination with an optical instrument, of a glass plate in an image plane thereof, relatively deep and narrow grooves in a surface thereof to define hair-lines and a radium-luminous substance distributed along the edge of the plate to make said hair-lines visible.

13. The combination with an optical instrument, of a glass disk in an image plane thereof, relatively deep and narrow grooves in a surface thereof to define hair-lines and a radium-luminous substance distributed along the periphery of said disk to make said hair-lines visible.

14. The combination with an optical instrument including a tubular body, of a glass plate in the tubular body, relatively deep and narrow grooves in the plate, a recess adjacent the edge of the glass plate, and radium-luminous material in said recess.

In testimony whereof I have hereunto signed my name in the presence of two witnesses.

HEKTOR FENDERL.

Witnesses:
OL P. DE LOCOLO,
PUGUNELLI JINKOLLE.